Patented Sept. 20, 1932

1,877,867

UNITED STATES PATENT OFFICE

ERNEST HEY, OF BELLINGHAM, WASHINGTON, ASSIGNOR TO ALL-SOL COMPANY, OF BELLINGHAM, WASHINGTON, A CORPORATION OF WASHINGTON

ALLOY METAL FLUX AND PROCESS OF MAKING THE SAME

No Drawing.   Application filed May 9, 1928.   Serial No. 276,515.

My invention relates to an alloy metal flux and to the process of making the same. More particularly, my invention relates to a flux for soldering stainless metal alloys of iron and steel and chrome steel and nickel alloys, and like alloys, and for providing a stronger bond for iron and steel, including galvanized and cast, products.

While I have described my application as particularly applied to said alloys and to galvanized and cast iron and steel products, it is to be understood that my flux is also applicable to ordinary tin and copper products. However, it is not applicable to aluminum. I refer to it as an alloy metal flux because said alloys present particularly serious difficulties in soldering. It will be understood that in all soldering operations as heretofore commonly done it is the practice to use a raw acid on galvanized iron and steel products. Said galvanized products being zinc coated it is necessary to use hydrochloric acid or, as it is commonly referred to, a raw acid to cut the said zinc coating so that the solder will flow when applied thereto and penetrate through the zinc for the strongest bond. With such products a cut acid cannot be used. With ungalvanized iron products it is necessary to apply raw acid first and then a cut acid to make the solder flow to provide the necessary adhesion. On that type of copper having what is commonly known as a "black bloom", a raw acid must be first applied and then a cut acid to cause the solder to flow. On clean steel and copper and tin products cut acid only can be used. A primary purpose of my invention is to provide a single flux which is equally applicable to all these various metals and to protect the health of the operator and guard against corroding the surrounding machinery and tools by providing a flux which is characterized by being fumeless as respects health and machinery-corroding effects.

Furthermore, it is a purpose of my invention to provide as respects galvanized iron and steel products a flux which requires but a single application instead of the repeated applications of fluxes as heretofore employed, and at the same time to provide a flux which does not tarnish galvanized iron products and develop corrosion thereon as commonly occurs with ordinary fluxes which must be applied with a particularly highly heated iron.

A type analysis for a stainless alloy obtained on the market in addition to the steel is as follows: Carbon, under .10%; manganese, under .50%; sulphur, under .03%; phosphorus, under .03%; silicon, .50—1.25%; chromium, 16.5—18.5%; nickel, under .25%.

The field heretofore open to these stainless alloy metals has been very much restricted on account of the inability to produce a good solder bond due to the lack of a proper flux. Consequently, the field of application for these alloys has been very much restricted. These alloys are most difficult to tin. Some of the alloys have had a somewhat wider application, having been on the market longer and also because they tin more easily than other alloys, but despite this tinning the solder bond has no substantial strength and has been the cause of much dissatisfaction. To overcome this lack of strength, resort has been had to the expensive practice of seaming, i. e., crimping, and riveting to provide the necessary strength in addition to the soldering of the seam. But this does not solve the difficulty since vibration and galvanic action operate to break and loosen the solder, so that liquids or steam escape if said metal is employed to confine the same. Prior to my invention it has been declared on high metallurgical authority that some of the stainless alloys were such as could not be soldered with a good bond, i. e., with a solder bond having the strength, for example, as occurs in connection with ordinary metals such as tin plate and copper. Great sums of money have been spent in the search for a proper flux that would provide a solder bond to enlarge the field of use of some of these stainless alloys. A primary purpose of my invention is to provide a flux, which, in conjunction with solder, will provide a satisfactory solder bond for said alloys and metals, i. e., a solder bond having the required strength without seaming and riveting, said solder bond having strength equal to or approximating that of solder bonds which obtain in connection with ordinary tin plate and copper. My experience is that in both cases when the joint is broken, it is the solder that breaks and not the solder pulling apart from the metal.

The flux embodying my invention also operates to provide an improved bond for all other types of metals, except aluminum and aluminum alloys. In connection with the metal known in the market as "white metal", i. e., this being an alloy of tin, lead and aluminum, antimony sometimes being used for hardening, the flux embodying my invention works satisfactorily when said metal is heated to the extent that it commences to bead.

Some of these stainless alloys have one side designated as rough and dark gray, and the other side as buffed, i. e., light colored and shiny, being a very hard metal. Others are commonly buffed on both sides, i. e., made smooth and shiny. Relative binding the metal having one rough side, a fairly satisfactory solder bond on the rough side may be formed by using two fluxes, said fluxes comprising a raw acid application and then a cut acid application. More particularly, the treatment with the two fluxes is as follows: The surface to be soldered is treated with a concentrated hydrochloric acid solution and allowed to act for about three minutes. This raw acid is then washed off and a cut acid applied. By a "cut" acid is here meant hydrochloric acid prepared as follows: To a quantity of hydrochloric acid is added such quantity of zinc as will fully satisfy said acid and all action therebetween ceases. The solution is then poured off and constitutes what is herein referred to as "cut" acid. This process will be hereinafter abbreviated and referred to as the "two flux raw-cut acid process". This flux used in connection with ordinary solder forms a weak solder bond when used on the rough side of said stainless alloys. This bond snaps off easily, being readily broken with the hands, and has a strength of about one-sixth that of the ordinary solder bond obtaining in connection with tin plate and copper. The difference in strength is appreciated when it is noted that when two pieces of copper are soldered or sweated together, it is almost impossible to pull the two apart even when pliers are used.

When the said two flux raw-cut acid mixture is used on the buffed or smooth side of said alloys, practically no bond with ordinary soldering practice results. As will be hereinafter explained, when the metals are heated, a somewhat improved bond results, but not sufficiently improved to be of commercial value.

In general, the same observations apply to the various stainless alloys. Some, however, are more easily tinned than others. With some of said alloys a single flux comprising the cut acid process, i. e., zinc chloride solution alone, may be used, and while a bond results as stated, nevertheless, it is very weak as indicated and does not solve the problem even when the metal is seamed for reasons hereinabove set forth. These observations apply to the buffed side of said stainless alloys.

When some of said alloys are soldered by using the above described two flux raw-cut acid method and the solder thereupon resulting is submerged in water and allowed to remain there for some time, or if heat is applied to the soldering job such as occurs in ordinary cooking operations, the bond is destroyed and the metal separates from the solder. That is, the said acid method of soldering these alloy metals is useful only in those applications of the metal where it is not to be exposed to water, heat, vibration or strain. However, the soldered joint resulting from the use of my flux withstands all these tests and provides a soldered joint in every way comparable to the soldered joint when applied to copper and ordinary tin products. I have found that if the said stainless metal alloys are first pickled in hydrochloric acid for a suitable period, such as about one hour, at normal temperature, the period of time being a function of the temperature, and then the said acid flux is applied, i. e., if the two flux raw-cut acid process is followed, a satisfactory soldering bond results, but, obviously, such method of soldering is impractical for most fields of application as only a small portion of the metal is to be treated and only this small portion is available for treatment and the balance of the metal forming the particular bond in question must not be exposed as it becomes readily stained with chlorides.

Further objection to the two flux raw-cut acid mixture described above is that it does not penetrate where the joint is to be provided between crimped, i. e., seamed, portions of the metal. The acid does not work in under the parts. However, the flux embodying my formulæ overcomes this difficulty and provides a satisfactory joint in every instance,—my preferred formula being pre-eminent in this respect.

Fluxes are ordinarily employed for removing oxide films on the portion of the metal to be soldered. The difficulty of soldering some of said stainless alloys is that they do not apparently have oxide films. I have discovered that the difficulty of soldering the said alloys resides in the fact that a film seems to form upon the surface of a character different from that on ordinary metal products aside from aluminum. This film seems to be of an oily character. Heating the surface to be soldered just previous to applying the flux and the solder helps in breaking down the film, i. e., the film yields to heat, and its objectionable action is overcome in large part. When the metal is not heated other than as results from applying the soldering iron and the usual flux, i. e., the two flux raw-cut acid mixture, and solder is applied in the usual soldering manner, the film seems to be loosened by the flux and then reacts upon and is assimilated by the solder, tending to crystallize the same. This applies to some of the alloys as respects the buffed side, it being remembered that with some of the alloys only the cut acid is necessary, the raw acid being omitted. As to the unbuffed sides, the same observations apply, only not quite to such a pronounced degree. My experiments indicate that while the unbuffed side of said alloys provides a better solder bond, such as it is, with said usual fluxes, nevertheless this may be largely accounted for by reason of the increased surface incident to its unevenness as compared to the smooth flat surface of the buffed side. The film seemingly is more pronounced on the buffed side. However, such objections are overcome by the flux embodying my invention, it being a primary object of my invention to provide a single flux which will remove or nullify the effect of said film, and of such a character as does not need to have the metal initially heated more than occurs to the small extent during the usual soldering operation, and is not subject to being reacted upon by the film and become crystalized thereby, but will cause the solder to flow evenly as is usual in common soldering operations, i. e., on tin plate and copper.

The flux embodying my invention may be prepared according to several formulæ:

(A) Place 5 cc. acetic acid in a container; (B) add 20 cc. of a mixture herein called dilute acid oil ammonium chloride solution, said solution being saturated with zinc chloride. The formula for preparing the said dilute acid mixture is as follows:

To 80 lbs. water add 10 lbs. hydrochloric acid, commercial strength. To this water-acid mixture add 2½ lbs. zinc metal; next add 1 lb. ammonium chloride salts. In about twenty to forty minutes at normal temperature the mixture so far developed commences to ebullate and develop heat. At this stage ½ lb. of an oil is added. The adding of the ½ lb. of oil to the water-hydrochloric acid zinc ammonium chloride mixture must be done in a particular manner in order to get the said ½ lb. of oil uniformly distributed therethrough and to continue uniformly dispersed therethrough. To do this, the ½ lb. of oil should be gradually released in very small quantities at or near the bottom of the container of the dilute acid zinc ammonium chloride solution, and allowed to rise therein at the time the ebullition and heating commences. One method of doing this is to place said ½ lb. of oil in a pint glass jar (or non-metallic container), with a finely perforated zinc cover, the perforations being about one-twentieth of an inch in diameter. At the ebullition stage this pint jar with the ½ lb. of oil therein with said perforated cover in place is anchored in the bottom of the container of the water-hydrochloric acid zinc ammonium chloride solution. The heat developed in the latter mixture causes the oil in the jar to gradually escape through the perforated zinc cover, the oil being lighter than water tends to rise. The rate of release of the oil is determined, that is, maintained approximately uniform, as the action slows down by reason of the acid increasing the diameter of the perforations. As this oil rises through the said mixture it is picked up and swirled around and around and is absorbed in the mixture, becoming thoroughly intermixed therewith. The resulting mixture constitutes an improved fumeless and non-evaporating flux or main part thereof used on ordinary metals in soldering. The preferred oil referred to above is a soluble cutting oil, the same being of a vegetable mineral oil combination. Ordinary lubricating oil, mineral or vegetable, may be employed but the same does not give so beneficial results as a soluble oil combining the two.

To saturate this dilute acid mixture or flux with zinc chloride for step B, add zinc chloride salts until saturated, i. e., until some of the salts remain in the bottom of the container. By adding the metallic zinc, zinc chloride and ammonium chloride, the weight of the water and the oil of step B is increased so that within said dilute acid oil ammonium chloride solution the tendency of the chlorides to settle to the bottom in layers is eliminated.

(C) Continuing with the formula herein, to the steps A and B next add 40 cc. of said dilute acid oil solution saturated with ammonium chloride salts. To obtain full absorption, this solution should be slightly warm (not heated). (D) Add 20 cc. hydrochloric acid, commercial strength, and (E) add 5 cc. hydrochloric acid, commercial strength, saturated with copper, (ingot or granulated form or in salt form). The copper is added in stage E until the acid becomes clear, but is not provided in excess. Preferably, the copper is cleaned of all oxide by immersion in hydrochloric acid before being used in step E. The hydrochloric acid in all instances should be preferably free of sulphur. In place of the step E there may be substituted 5 cc. hydrochloric acid saturated with ferric chloride, i. e., some ferric chloride remains in the bottom. My experiments show that the copper and iron make the solder flow better. The above formula is characterized by substantially resisting any breaking down tendency by the lapse of time, and provides a flux for said alloys which does not bead, but forms a smooth even coating, and thus eliminates the waste of flux in the form of beads. Also, with this formula I find it is not necessary to initially heat the surface of the alloy metal to be treated, but it may be applied after the manner of the usual soldering operation. The ammonia or the oil gives a smooth (velvety to the touch) soapy flow to the flux. The above constitutes my preferred formula. Glacial acetic acid gives the best results, but acetic acid of lower purity can be used. I find that zinc chloride and commercial (concentrated) hydrochloric acid are essential. The acetic acid may be replaced by any of the following organic or so-called weak acids with good results: oxalic acid-saturated water solution; citric acid-saturated water solution; tartaric acid-saturated water solution. Phosphoric acid should not be present in appreciable quantity, although small traces of the same are helpful. Stearic acid compound solution also works satisfactorily. Boric acid gives the least satisfactory results, as it seems to produce a gray film on the top of the solder, said film having a lead color so that the soldering job does not have the bright finish of ordinary solder, but it does give a bond. However, be it particularly noted that none of the so-called weak acids give as satisfactory results as does the acetic acid.

A second formula for my flux may be prepared by omitting in the above the oil part of the dilute acid oil ammonium chloride solution. The flux of this second formula, while giving substantially the same strength of bond, is not characterized by the high degree of workability of the first or preferred formula. Some of said stainless alloys seem to have a certain repulsion to fluxes in general. The flux, on account of the hereinbefore mentioned film which characterizes particularly the buffed side of said alloy metal, seems to be refused or is caused by said film to collect in beads instead of spreading out uniformly over the surface of the metal. The addition of the oil overcomes this and causes the flux to spread on the surface of the metal. This may be due to the oil lowering the surface tension of the solution, causing the flux to be dispersed uniformly over that portion of the metal to be soldered. At any rate, uniform action on the film is provided by my preferred formula. The oil seems also to act as a protective coating to the flux against the oxygen of the air to avoid the forming of oxides as between the flux and the film. It will be particularly noted that it is important that the oil be of a character that it may be intermixed with the solution herein and remain dispersed uniformly therethrough. The said soluble oil may be mixed with water for ordinary purposes by boiling and become dispersed therethrough. However, such procedure cannot be followed in the production of my formula because such heating will cause the other elements of the formula to interact at least in part and destroy in large measure their effectiveness as fluxing agents. It will be understood that the heat developed by the ebullating solution falls far short of reaching the boiling temperature of water, the ebullition phenomenon being the result of the escape of hydrogen. The method herein described of introducing the soluble oil overcomes the difficulty described and results in its being introduced uniformly throughout the solution. With other oils, while a portion thereof remains uniformly distributed, there is a tendency in the course of time for a portion thereof to escape to the top.

A third formula for the flux embodying my invention may be prepared as follows: One part of commercial acetic acid is placed in a container; to this three parts of hydrochloric acid previously saturated with zinc chloride to its utmost capacity is added; to the mixture thus formed, including the acetic acid, is next added one to two parts of hydrochloric acid previously saturated with copper. (The acid saturated with copper is preferably warmed before being added to the acetic acid). Next, to the above are added two parts of hydrochloric acid previously saturated with ferric chloride. These elements are then well mixed together. The hydrochloric acid employed in the above is preferably free of all sulphur content and is of commercial, i. e., concentrated, strength. The flux thus formed, to obtain the best results, I find should be slightly warmed when applied to the metal when employed with the stainless alloy metals above named. It is to be understood that the above proportions are those which have been found to date to give completely satisfactory results. The flux is applied otherwise in the usual manner, and the solder is then added with the soldering iron or torch and the usual soldering operations followed. The soldering iron should be well heated.

When the flux is first applied, the fluid on the metal takes on an amber or yellow color. The best results, I find, are obtained by waiting from thirty seconds to a minute until this becomes clear. The disappearance of the color depends upon the temperature, a longer period being involved if the surrounding air is cold. One application of the flux is sufficient and leaves the soldering iron tool clean and bright. Common acetic acid may be used, but my experiments show that the commercial glacial acetic acid gives a much improved result. In connection with this formula, the same observation applies to the use of other so-called weak acids as in the preferred formula.

In forming the formulæ herein throughout set forth, an important step seems to be that the acetic acid should be placed in the container first. If added last, there is an adhesion, but the bond is not nearly as satisfactory. By placing the acetic acid in the container first, it seems to become more evenly distributed throughout the solution, and objectionable action upon the acetic acid by the stronger acids of the solution is avoided.

A fourth formula for the flux embodying my invention may be as follows: A saturated solution of zinc chloride in concentrated hydrochloric acid, a saturated solution of ammonium chloride in concentrated hydrochloric acid, and an organic acid,—preferably acetic acid (glacial), the same being placed in the container first. I find the following mixtures for this fourth formula give satisfactory results:

Parts by Volume

No. 1

15 parts saturated solution zinc chloride in hydrochloric acid
10 parts saturated solution ammonium chloride in hydrochloric acid
10 parts glacial acetic acid.

No. 2

15 parts saturated solution zinc chloride in hydrochloric acid
10 parts saturated solution ammonium chloride in hydrochloric acid
10 parts saturated solution citric acid in glacial acetic acid.

No. 3

10 parts saturated solution zinc chloride in hydrochloric acid
5 parts saturated solution ammonium chloride in hydrochloric acid
10 parts saturated solution oxalic acid in water.

No. 4

10 parts saturated solution zinc chloride in hydrochloric acid
5 parts saturated solution ammonium chloride in hydrochloric acid
10 parts saturated solution tartaric acid in water.

No. 5

15 parts saturated solution zinc chloride in hydrochloric acid
10 parts saturated solution ammonium chloride in hydrochloric acid
10 parts saturated solution citric acid in water.

No. 6

15 parts saturated solution zinc chloride in hydrochloric acid
10 parts saturated solution citric acid in water
10 parts saturated solution ammonium chloride in water.

No. 7

The addition of 2 parts of a saturated solution of ferric chloride in hydrochloric acid to above mixtures 1 to 6.

No. 8

15 parts saturated solution zinc chloride in hydrochloric acid
10 parts saturated solution ammonium chloride in hydrochloric acid
5 parts saturated solution stannous chloride in hydrochloric acid
10 parts glacial acetic acid.

No. 9

15 parts saturated solution zinc chloride in hydrochloric acid
10 parts saturated solution ammonium chloride in hydrochloric acid
5 parts saturated solution stannous chloride in hydrochloric acid
10 parts saturated solution citric acid in acetic acid.

The addition of ferric chloride, as respects my first three formulæ and the above first seven mixtures of the fourth formula, is of some benefit, but is not essential. Also, stannous chloride is found to be beneficial but not essential. The presence of the copper in the solution seems to have the tendency of lowering the efficiency of the flux, but is helpful in making a smooth flowing solder, preventing the forming of a scum and thickening.

The use of a softer solder on stainless metals seems to give better results than where the usual solder composed of fifty percent lead and fifty percent tin is used. I find a most suitable solder to be formed by taking 22 parts by weight of zinc, 11 parts tin, 0.25 parts copper, and 66.75 parts lead.

In formulæ having copper, iron or tin, or any two of them present, there is a tendency for the flux to break down after standing about three days. Hence, these formulæ should only be used where immediate or prompt use is to occur.

However, it will be understood that my preferred formula overcomes all of said objections referred to in the next preceding paragraph. The flux of my preferred formula when being applied is characterized by being fumeless, so far as injurious fumes are concerned, but it should be understood that there is the odor fume. Also, the said flux does not evaporate and is non-deteriorating. The quality of being fumeless is very important, the fumes given off by ordinary liquid flux corrodes seriously surrounding machinery and tools. For this reason, the soldering departments of machine shops are separated. The other formulæ do have fumes, but not to the extent of ordinary flux and they do evaporate.

I claim:—

1. The process of making a flux of the character described comprisig the steps of intermixing an organic acid with a solution of hydrochloric acid saturated with ammonium chloride salt; and adding a solution of hydrochloric acid saturated with zinc chloride salts.

2. The process of making a flux of the character described comprising the steps of intermixing acetic acid with a solution of hydrochloric acid saturated with ammonium chloride salts; and adding a solution of hydrochloric acid saturated with zinc chloride salts.

3. The process of making a flux of the character described comprising the steps of intermixing glacial acetic acid with a solution of hydrochloric acid saturated with ammonium chloride salts; and adding a solution of hydrochloric acid saturated with zinc chloride salts.

4. The process of making a flux of the character described comprising the steps of intermixing an organic acid with a solution of hydrochloric acid saturated with ammonium chloride salts; adding a solution of hydrochloric acid saturated with zinc chloride salts; and adding a solution of hydrochloric acid saturated with a metallic chloride salt.

5. The process of making a flux of the character described comprising the steps of intermixing acetic acid with a solution of hydrochloric acid saturated with ammonium chloride salts; adding a solution of hydrochloric acid saturated with zinc chloride salts; and adding a solution of hydrochloric acid saturated with a copper chloride salt.

6. In the process of making a flux of the character described, the step of intermixing an organic acid with a dilute hydrochloric acid oil ammonium chloride solution saturated with zinc chloride salts, which solution is formed by preparing a solution of dilute hydrochloric acid, zinc metal, ammonium chloride salts and then gradually dispersing oil therethrough.

7. In the process of making a flux of the character described, the step of preparing a dilute hydrochloric acid oil chloride solution saturated with zinc chloride salts, said dilute solution being formed by preparing a solution of dilute hydrochloric acid, zinc metal, ammonium chloride salts and then gradually dispersing oil therethrough.

8. In the process of making a flux of the character described, the step of preparing a dilute hydrochloric acid oil chloride solution saturated with zinc chloride salts, said dilute solution being formed by preparing a solution of dilute hydrochloric acid, zinc metal, ammonium chloride salts and then gradually dispersing a soluble oil therethrough.

9. A composition of matter of the character described comprising acetic acid; a mixture comprising water, hydrochloric acid, zinc metal, ammonium chloride salts, oil, and zinc chloride salts to the saturation point; a second mixture comprising water, hydrochloric acid, zinc metal, ammonium chloride salts, and oil, the ammonium chloride being present to the saturation point; hydrochloric acid; and hydrochloric acid saturated with metal or metallic salt, all of said materials being intermixed into a single composition.

10. A composition of matter of the character described comprising acetic acid; a mixture comprising water, hydrochloric acid, zinc metal, ammonium chloride salts, oil, and zinc chloride salts to the saturation point; a second mixture comprising water, hydrochloric acid, zinc metal, ammonium chloride salts, and oil, the ammonium chloride being present to the saturation point; hydrochloric acid; and hydrochloric acid saturated with copper or copper metal salt, all of said materials being intermixed into a single composition.

11. A composition of matter of the character described comprising the following constituents in substantially the following quantities, 5 cc. of acetic acid; 20 cc. of a mixture comprising 80 lbs. of water, 10 lbs. of hydrochloric acid, 2.5 lbs. of zinc metal, 1 lb. of ammonium chloride salts, 0.5 lbs. of oil, and zinc chloride salts added to the saturation point; 40 cc. of a second mixture comprising 80 lbs. of water, 10 lbs. of hydrochloric acid, 2.5 lbs of zinc metal, 0.5 lbs. of oil, and ammonium chloride salts added to the saturation point; 20 cc. hydrochloric acid; and 5 cc. hydrochloric acid saturated with metal or metallic salt.

12. A flux composition of matter comprising a saturated solution of zinc chloride in hydrochloric acid; a saturated solution of ammonium chloride in hydrochloric acid; and glacial acetic acid, all of said materials being intermixed into a single composition.

13. A flux composition of matter consisting of an intermixture of 15 parts of saturated solution of zinc chloride in hydrochloric acid; 10 parts of saturated solution of ammonium chloride in hydrochloric acid; and 10 parts of glacial acetic acid.

14. In the process of making a flux of the character described, the step of intermixing an organic acid with a dilute hydrochloric acid oil ammonium chloride solution saturated with zinc chloride salts, which solution is formed by preparing a solution of dilute hydrochloric acid, zinc metal, ammonium chloride salts and then gradually dispersing oil therethrough at the time when the ebullition and heating commences, due to the interaction of the acid and the zinc metal.

In witness whereof, I hereunto subscribe my name this 12th day of April, 1928.

ERNEST HEY.